C. H. PALMER & J. W. DENMEAD.
BOX MAKING AND SANDING MACHINE.
APPLICATION FILED JAN. 30, 1900.
985,831.
Patented Mar. 7, 1911.
4 SHEETS—SHEET 1.
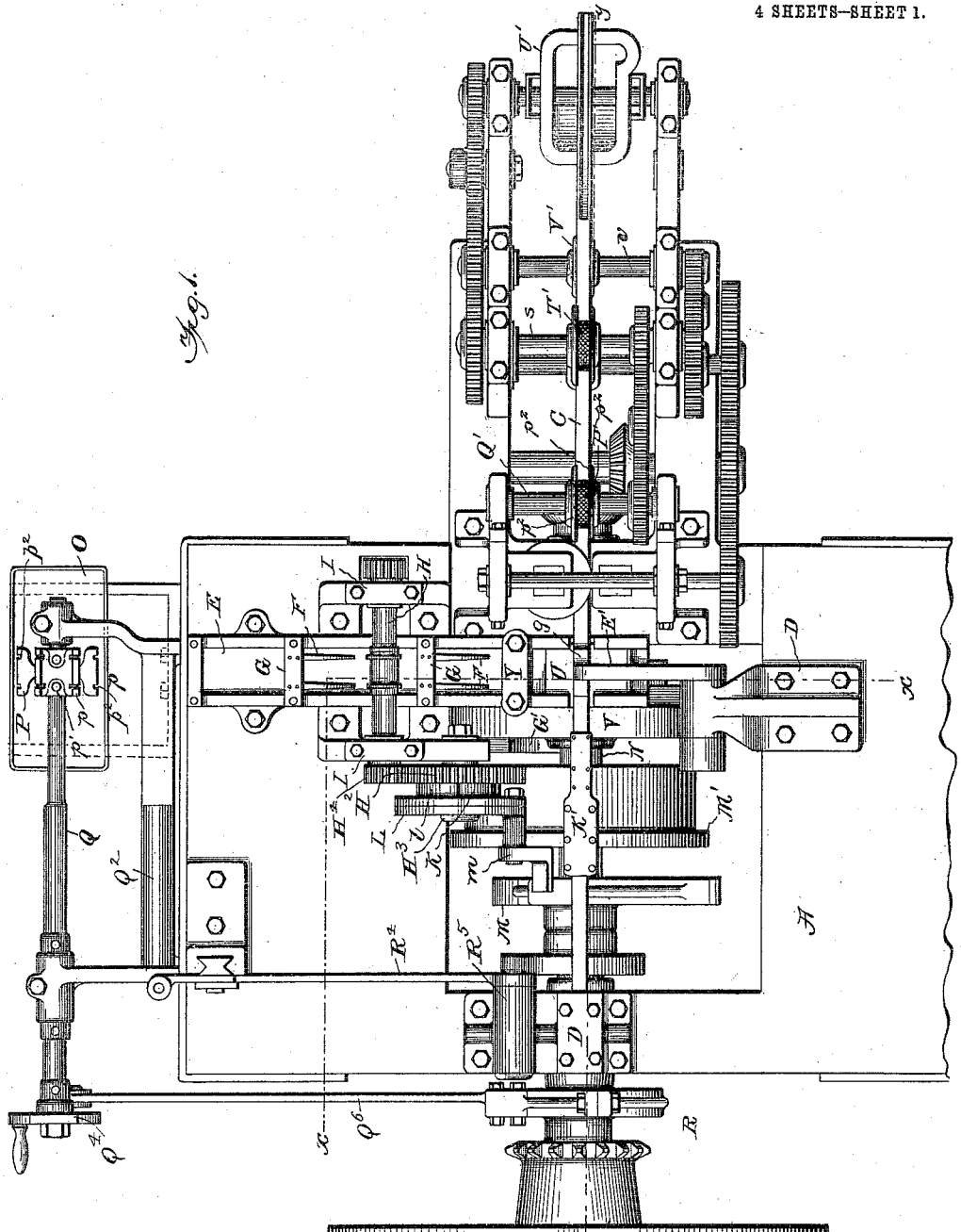

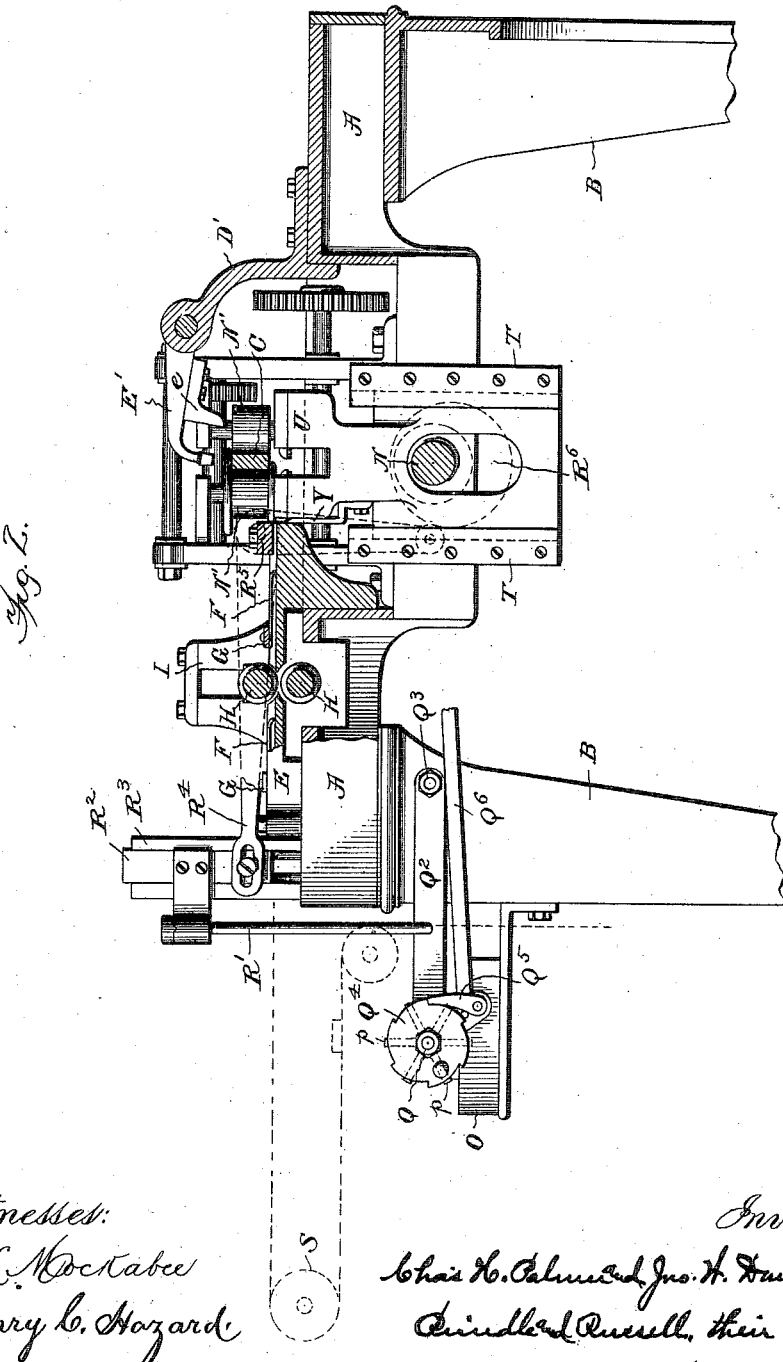

C. H. PALMER & J. W. DENMEAD.
BOX MAKING AND SANDING MACHINE.
APPLICATION FILED JAN. 30, 1900.
985,831.
Patented Mar. 7, 1911.
4 SHEETS—SHEET 3.
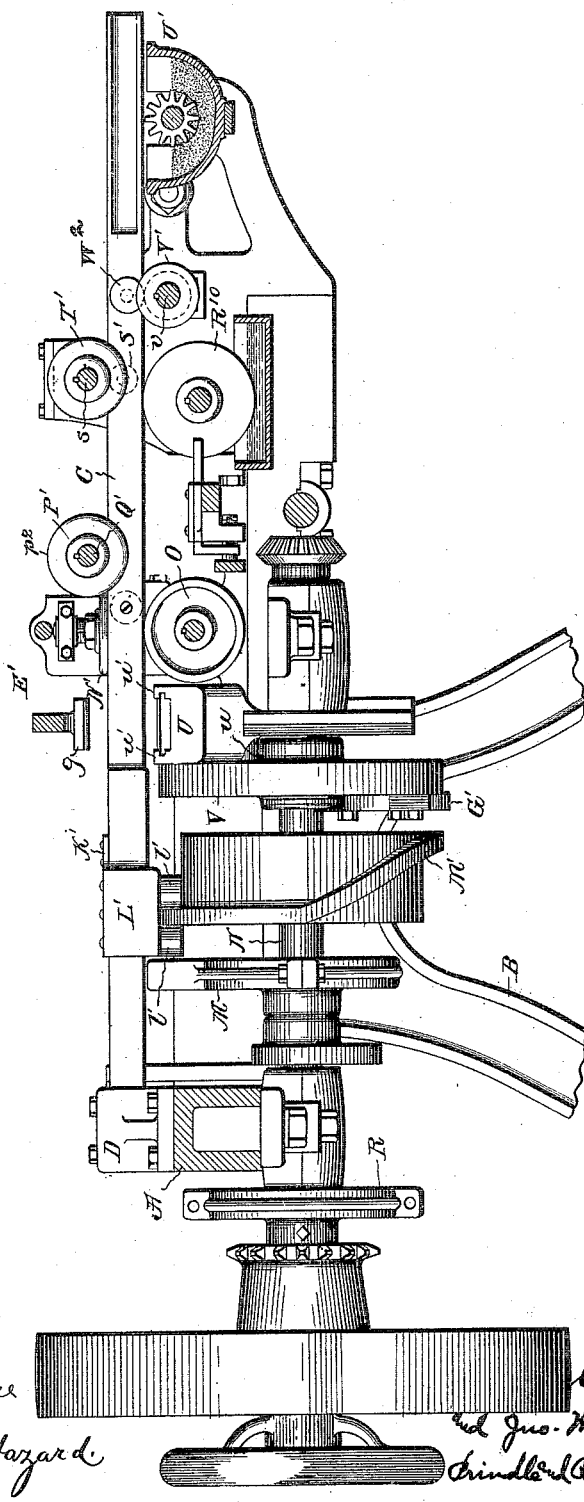

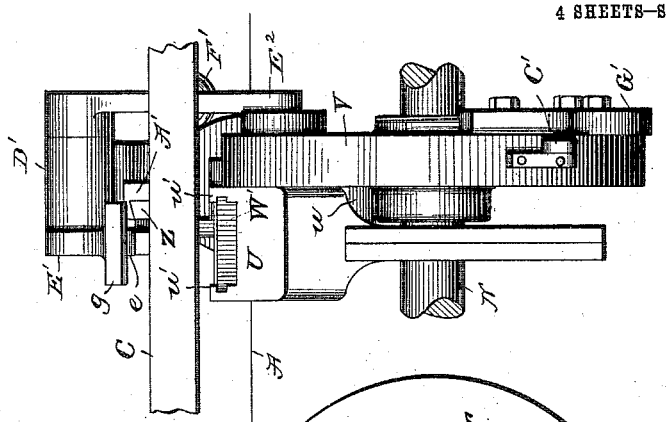
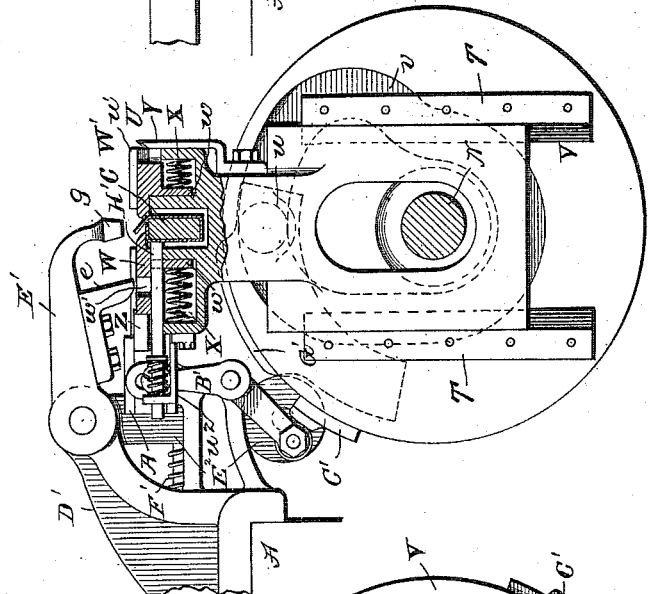
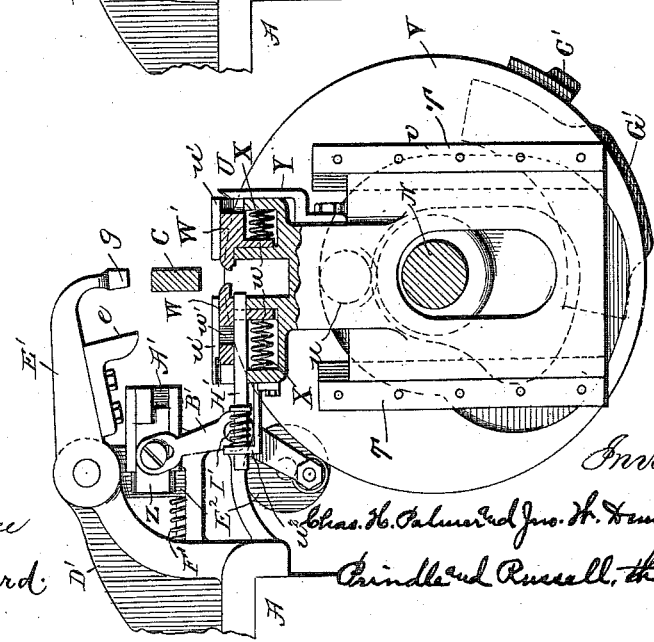

UNITED STATES PATENT OFFICE.

CHARLES HENRY PALMER AND JOHN WILLIAM DENMEAD, OF AKRON, OHIO, ASSIGNORS TO THE DIAMOND MATCH COMPANY, OF NEW YORK, N. Y., A CORPORATION OF ILLINOIS.

BOX MAKING AND SANDING MACHINE.

985,831.          Specification of Letters Patent.      Patented Mar. 7, 1911.

Application filed January 30, 1900. Serial No. 3,360.

*To all whom it may concern:*

Be it known that we, CHARLES H. PALMER and JOHN W. DENMEAD, of Akron, in the county of Summit and in the State of Ohio, have invented certain new and useful Improvements in Box Making and Sanding Machines, and do hereby declare that the following is a full, clear, and exact description thereof, reference being had to the accompanying drawings, in which—

Figure 1 is a top plan view of a machine embodying our invention for making and sanding the shucks or slides of match boxes; Fig. 2 is a vertical section of said machine on the line $x$—$x$ of Fig. 1; Fig. 3 is a vertical section on the line $y$—$y$ of Fig. 1; Fig. 4 is a detail view, partly in section, of the folding mechanism, showing the same in position ready to fold a box blank; Fig. 5 is a similar view, showing said mechanism when in a position about to complete the folding of a box blank; and Fig. 6 is a detail view in end elevation of such folding mechanism, in the position shown in Fig. 4.

Letters of like name and kind refer to like parts in each of the figures.

The object of this invention is to provide an automatic machine for forming and sanding the shucks or slides of match boxes, so that stock fed to the machine in a continuous strip, can be made into finished slides ready for use, and to this end, said invention consists in the machine, and in the parts thereof constructed substantially as hereinafter set forth.

The class of machine to which the invention pertains more especially, is that in which a bar or mandrel is employed whose form, in cross section, is the same as that of the slide to be made, around which the stock is folded, and along which, after being folded, it is moved endwise to present it to the various devices necessary to complete the slide, and from which the finished article is passed.

In the embodiment of the invention selected for illustration there is employed a table A, mounted on legs B and B, above which is supported the former or mandrel C in the form of a long bar that is oblong in cross section, with one end fastened to the table by a block or box D, and the other end free and projecting beyond the table. Stock, in the form of a strip of pasteboard, or heavy paper, already printed, is taken from a reel, and delivered to a position beneath the mandrel for cutting by a knife into a length to form a slide, and for engagement by devices that fold such length about the mandrel. The strip of stock from the reel is passed through a guideway that extends at right angles to the length of the mandrel, and consists of a trough E and two pairs of spring fingers F and F that bear yieldingly upon the upper side of the stock, each pair being attached to and supported by a cross bar G. The stock is drawn from the reel by a pair of rolls H and H, that respectively engage the lower and upper sides thereof, at a point between the two pairs of fingers F and F, being mounted in bearings in standards I and I on the table A at opposite sides of the trough E. The two rolls H, H, are geared together in order that they may rotate in unison, and to impart to said rolls an intermittent rotary movement, a gear wheel $H^2$, journaled upon a stud $H^3$ and which is carried by the feed roll frame I, meshes with the gear $H^4$ carried by the upper feed roll. A ratchet wheel K is also fastened to said gear $H^2$, and is engaged by a pawl $l$ carried by a disk L, which latter is oscillated through the medium of an eccentric M on the main shaft N, said disk being connected to said eccentric by a rod $m$. The size of the gear $H^2$ and that upon the upper feed roll with which it engages is so proportioned that one-quarter of a turn of the gear $H^2$ will cause one complete rotation of the feed rolls.

Before entering the trough E, there is applied to the stock, at appropriate points, the glue required to cause the overlapped portions of the slide to adhere, or stick together, and there is shown for this purpose a mechanism which comprises a glue pot O and a glue applying device P. The device P is mounted on a shaft Q carried by a frame $Q^2$, said frame being hingedly connected, as at $Q^3$, to the machine frame to be capable of swinging in a vertical direction. Arranged at the end of the shaft Q, opposite to the device P, is a ratchet wheel $Q^4$, which is engaged by a pawl $Q^5$, said pawl receiving an oscillatory movement about said ratchet wheel by a connecting rod $Q^6$ actuated by an eccentric R carried by the main shaft N. Thus at each rotation of the shaft N the device P is rotated to the extent of one notch of the wheel $Q^4$. The device P comprises a series of equi-distant fingers $p$ radiating from a hub $p'$ on the shaft Q, and the faces of said fingers which constitute the glue-applying surfaces are grooved transversely, as at $p^2$, so that in applying the glue to the paper these grooves will form two spaces in the glue area which will remain blank, the glue otherwise being applied in the form of a stripe which extends crosswise of the stock. As stated, the frame $Q^2$ has a swinging movement in a vertical direction, the purpose of this being to move the glue wheel P from the pot, against the strip of paper, and back again to the pot, and to accomplish this movement a vertically-extending rod R' is connected at its lower end to the frame $Q^2$, the upper end of said rod being also connected to a slide $R^2$ which works in a suitable guide $R^3$ arranged upon the machine frame. The slide $R^2$ is reciprocated in said guide by a bell-crank lever $R^4$, shown clearly in Fig. 2 by full and dotted lines, said lever being fulcrumed at $R^5$ and having its lower end engaged and actuated by a cam $R^6$ carried by the main shaft N. Thus at each rotation of the shaft N the glue wheel P, through the connections described, is lifted from the glue-pot against the paper strip, applies the glue to the latter, and is again returned to the glue pot. After receiving the glue, the stock passes over a roller S, by which the glue-holding side is placed uppermost, and it is in this position that the stock passes through the trough E. The stripe of glue is, of course, not continuous, but there are two blank spaces to avoid application of glue to the paper-engaging portions of the upper feed roll H.

Mounted in parallel, vertical guides T and T, carried by the machine frame, as clearly seen in Fig. 2, is a head U from one side of which projects a stud or roller $u$ that enters a cam groove $v$ in the side of a disk V on the main shaft N, so that the revolution of the latter will reciprocate said head vertically. At its upper end, the head U is vertically slotted, or bifurcated, so that it may straddle the mandrel C, when moved to its highest limit of motion, and mounted in horizontal guideways in the head on opposite sides of the slot are plates W and W', respectively, whose inner ends project normally into the slot, to points beyond the planes of the vertical sides of the mandrel C, when said ends are above or below the same. A coiled spring X placed in a cavity in the head, beneath each plate, and pressing at one end against a lug $w$ depending from the plate, holds the latter yieldingly in the position described. Flanges $u'$ and $u'$ project from the head U above the plates W and W', providing a guideway on the head that is in line with the trough E when the head is lowered, so that the paper stock is guided over said plates, and rests upon the same. At the side of the head U toward the trough E, there is a knife Y, by which, on the ascent of the head, the portion of stock to form the slide, is cut off, and it will be seen that after being thus cut off, such portion, by the continued ascent of the head will encounter the mandrel C, and be folded over the bottom and two sides of the latter, the two plates W and W' retreating as the mandrel bottom is encountered, and passing up the two sides thereof, but pressing the blank against such sides, by reason of the springs X acting upon the depending lugs $w$, the upper inner corners of the plates being beveled, or rounded, as shown, to cause their outward movement when they meet the bottom of the mandrel. The portions of the stock or blank thus folded and pressed against the sides of the mandrel, are of such length as to project above the top of the latter, and said projecting portions are next folded over the mandrel top, first one portion being bent and then the other, by the inward movement of the two plates W and W'.

To cause the folding of one flap in advance of the other, the plate or folder W which does such folding, is moved inward earlier than the other when the two reach the top of the mandrel C, there being for this purpose, means supplementing the spring X for positively actuating said folder. Such means, as shown, consists of a slide Z, mounted in a guide A', which engages the outer end of the folder W, and has pivotally connected to its side one end of a bell-crank lever B' whose other end is in the path of a cam C' on the periphery of the disk V. As the slide guide A' is fixed, whereas the folder W moves with the head U, there is no connection between said slide and folder. The amount of inward movement permitted the other folder W' is such as to but partially fold the remaining flap, (which is the one with the glue.) While the spring X that acts upon the folder W serves to force the same inwardly, the positively-acting slide Z is also employed to give the folder W an inward movement, and thereby fold the unglued edge of the blank inwardly in advance of the partial folding of the glued edge of the blank by the folder W', the springs X being employed, as previously indicated, to hold the folders yieldingly in the head U. In this connection, however, it is observed that the spring X, which is employed with the folder W', is not as large as the spring X employed with the folder W. Hence, the action of the spring employed with the folder W' is more sluggish than the spring employed with the folder W, and with the slide Z to augment the action of the spring X associated with the folder W, the latter will move inwardly earlier than the folder W'. Pivoted to a bracket D' fastened to the table A, is a lever E', one end E² of which is pressed, by means of a spring F', in the path of a cam G' on the disk V while its other end $g$ is shaped to enable it to readily engage the partially turned flap, and press it down upon the other flap. Attached to or projecting from the lever E' is a finger $e$, which, by the movement of the lever, is swung into or out of engagement with the folder W, a hole $w'$ being formed in the latter for the entrance of said finger, the latter acting when moved into the hole to retract the folder sufficiently to remove its inner end from beneath the partially turned flap when it is pressed down by the lever end $g$. Mounted in the head U directly below the folder W is a horizontal bar H' whose inner end engages the blank close to the top of the mandrel, against which it is pressed by means of a coiled spring I' upon a portion of the bar between the head U and a bracket $u^2$ fastened to the head, the outer end of the bar being passed through and supported by an opening in the bracket. By the pressure of the bar H', the blank is held from being pulled off the mandrel by the withdrawal of the folder W preliminary to the pressing operation of the lever E'. After being folded around the mandrel, the now substantially complete shuck is moved longitudinally along the bar to be ironed or pressed to form sharp, clear corners, to firmly unite the flaps, and to be glued and sanded. It is moved first by means of a slide K' that is attached to and moves with a head L' fitted upon the mandrel, and having two rollers $l'$ and $l'$ between which passes a cam M' mounted on the main shaft N, by the revolution of which the head and slide are reciprocated. The slide K' embraces the two sides and the bottom of the mandrel, and hence its end engages the end of the shuck except at the top, where the laps are. By the slide K', the shuck is moved to a point where it is engaged by two ironing rolls N' and N' at opposite sides of the mandrel, and a feed roll O at the bottom thereof, one of said rollers N' being provided with end flanges which embrace the upper and lower sides of the mandrel C. Just beyond said rolls, is a supplemental ironing roll P' mounted on a horizontal shaft Q' above the mandrel, so that its periphery will bear upon and press the laps of the shuck upon the mandrel, and having on opposite sides flanges $p^2$ and $p^2$ that pass over the sides of the mandrel, and act to press the sides of the shuck against the sides of the mandrel, thus forming sharp, clear corners, and giving a set to the upper portion of the shuck, thus acted on. The shuck is next passed to and over a glue applying wheel $R^{10}$ beneath the mandrel, taking glue from a pot or tank, being moved along by a pair of feed rolls that engage the upper side of the shuck, one roll S' being mounted in a recess in the mandrel, and the other roll T' on a shaft $s$ above the mandrel; and after having glue applied to it the shuck is passed to and over a sanding mechanism U' of usual construction, and then off the mandrel, completed. Between the gluing and sanding mechanisms the shuck is acted on by a flanged roll V', mounted on a shaft $v$ beneath the mandrel, which presses the portions of the shuck adjacent to the two lower corners, to make the latter clear and sharp. The roll V' preferably coacts with a roll $W^2$ journaled in a recess in the mandrel.

Suitable trains of gearing, deriving motion from the main shaft N, but not needing to be described, are employed to revolve the ironing and other rolls and wheels along the mandrel.

It will be seen that by our machine, the stock, in a continuous strip, is fed from a reel, has the glue or paste applied for uniting the laps, is carried to a position between the mandrel and the cutting and folding devices, enough to form a shuck is cut from the end of the stock and folded completely around the mandrel and its laps pressed together, and is then passed along the mandrel for further treatment to complete it for the boxing of matches.

Of course, our invention is applicable to machines for making shucks or box parts which do not require to be sanded, and we therefore do not limit the scope of our invention to machines having the construction and organization of parts such as is herein shown and described.

Having thus described our invention what we claim is:—

1. In a machine for making boxes, the combination of a mandrel, means for folding a blank about the mandrel and crosswise thereof, means for moving the blank along the mandrel after the blank is folded, a set of pressing rolls to act on the blank after being folded, and a supplemental flanged roll the flanges of which embrace the mandrel to act on the lapped portions of the folded blank after action thereon by said pressing rolls.

2. In a machine for making boxes, the combination of a mandrel rectangular in cross section, means for folding a blank about the mandrel and crosswise thereof, means for moving the blank along the mandrel after the blank is folded, a set of pressing rolls to act on the blank after being folded, and a supplemental flanged roll to act on the lapped and adjacent corner portions of the folded blank after action thereon by said pressing rolls.

3. In a machine for making boxes, the combination with a mandrel, of a pair of opposite folders, a head movable relatively to the mandrel and on which the folders are mounted, means for interposing a blank between said head and said mandrel, said folders normally projecting across the plane of the sides of the mandrel, whereby upon relative movement of the head and mandrel the blank is partially folded about the mandrel, means for imparting movement to said head, and means for actuating one of said folders, whereby the same folds the blank in advance of the other.

4. In a machine for making boxes, the combination with a mandrel, of a head movable relatively to said mandrel and provided with guideways, a pair of opposite folders slidably mounted in said guideways, means for interposing a blank between said head and said mandrel, said folders normally projecting across the plane of the sides of the mandrel, whereby upon relative movement of the head and mandrel the blank is partially folded about the mandrel, means for imparting movement to said head, and means for actuating one of said folders, whereby the same folds the blank in advance of the other.

5. In a machine for making boxes, the combination with a mandrel, of oppositely-acting folders, a support therefor, means for operating said support to move the folders from a position on one side of the mandrel to a position at the opposite side thereof, said folders in both positions overlapping the mandrel, the latter acting upon the folders to spread the same apart when the folders are moved to perform a folding operation, and means for pressing said folders toward each other.

6. In a machine for making boxes, the combination with a mandrel, of a movable bifurcated head, means for imparting movement thereto, oppositely-acting folders carried by said head and arranged at the sides of the bifurcation thereof, said folders having their ends adjacent to the mandrel normally overlapping the same, said head being adapted to move the folders from a position at one side of the mandrel to a position at the opposite side thereof, the mandrel acting upon said folders to spread the same apart when the folders are moved to perform a folding operation, and means for pressing said folders toward each other.

7. In a machine for making boxes, the combination with a mandrel, of a pair of opposite folders, a head movable relatively to said mandrel and on which the folders are mounted, means for interposing a blank between said head and said mandrel, said folders normally projecting across the plane of the sides of the mandrel, whereby upon relative movement of the head and mandrel the blank is partially folded about the mandrel, means for imparting movement to said head, means for actuating one of said folders, whereby the same folds the blank in advance of the other, means to positively retract said folder after a folding action, means for pressing the laps of the blank, and means for actuating said lap-pressing means toward and away from the mandrel.

8. In a machine for making boxes, the combination with a mandrel, of a pair of oppositely-arranged folders, means for moving said folders relatively to said mandrel to fold a blank thereon, a lap-pressing device coöperating with the mandrel, and mounted to swing toward and away from the latter and means for actuating said device.

9. In a machine for making boxes, the combination with a mandrel, of a pair of oppositely-arranged folders, means for moving said folders relatively to said mandrel to fold a blank thereon, a swinging lap-pressing device coöperating with the mandrel, means for actuating said device, and a projection carried by said lap-pressing device and engaging one of said folders when the lap-pressing device is swung toward the mandrel to retract said folder after a folding action.

10. In a machine for making boxes, the combination with a mandrel, of a pair of oppositely-arranged folders, means for moving said folders relatively to said mandrel to fold a blank thereon, means for pressing the laps of said blank, means for actuating said lap-pressing means, means to retract one of said folders, and a device to hold the folded blank against the mandrel as said folder is retracted.

11. In a machine for making boxes, the combination with a mandrel, of a pair of oppositely-arranged folders, means for causing one of said folders to operate in advance of the other, means for pressing the laps of said blank, means for actuating said lap-pressing means, means to retract one of said folders, and a device to hold the folded blank against the mandrel as said folder is retracted.

12. In a machine for making boxes, the combination with a mandrel, of a folding mechanism comprising a bifurcated head and folders carried thereby, means for moving said head relatively to said mandrel, a knife carried by said head, and means for feeding stock to a position between the mandrel and the head.

13. In a machine for making boxes, the combination with a mandrel, of a pair of oppositely-arranged folders, means for moving said folders relatively to said mandrel to fold a blank thereon, a lap-pressing device coöperating with the mandrel, means for actuating said device toward and away from the mandrel, means for moving the folded blank along the mandrel, and a set of pressing rolls for acting on said blank after action thereon by said folders.

14. In a machine for making boxes, the combination with a mandrel, of a pair of oppositely-arranged folders, means for moving said folders relatively to said mandrel to fold a blank thereon, a lap-pressing device coöperating with the mandrel, means for actuating said device, means for moving the folded blank along the mandrel, a set of pressing rolls for acting on said blank after action thereon by said folders, and a supplemental flanged roll to act on the lapped portions of the folded blank after action thereon by said pressing rolls.

15. In a machine for making boxes, the combination with a mandrel, of a pair of oppositely-arranged folders, means for moving said folders relatively to said mandrel to fold a blank thereon, a lap-pressing device coöperating with the mandrel, means for actuating said device toward and away from the mandrel, a reciprocatory head for moving the folded blank along the mandrel, and a set of pressing rolls for acting on said blank after action thereon by said folders.

16. In a machine for making boxes, the combination with a mandrel, means for feeding stock thereto, and means for severing a blank from said stock, of a pair of oppositely-arranged folders, means for moving said folders relatively to said mandrel to fold a blank thereon, a lap-pressing device coöperating with the mandrel, means for actuating said device toward and away from the mandrel, means for moving the folded blank along the mandrel, and a set of pressing rolls for acting on said blank after action thereon by said folders.

In testimony that we claim the foregoing we have hereunto set our hands this 27th day of Dec. 1899.

CHARLES HENRY PALMER.
JOHN WILLIAM DENMEAD.

Witnesses:
   TOM F. PALMER,
   B. C. ROSS.

---

Copies of this patent may be obtained for five cents each, by addressing the "Commissioner of Patents, Washington, D. C."